US012603741B2

(12) United States Patent
Soltani et al.

(10) Patent No.: US 12,603,741 B2
(45) Date of Patent: Apr. 14, 2026

(54) FLEXIBLE INTRA-SYMBOL MULTIPLEXING OF DMRS OF DIFFERENT ANTENNA PORTS FOR SINGLE CARRIER WAVEFORM IN HIGHER BANDS

(71) Applicant: QUALCOMM Incorporated, San Diego, CA (US)

(72) Inventors: Morteza Soltani, San Diego, CA (US); Jun Ma, San Diego, CA (US); Xiaoxia Zhang, San Diego, CA (US); Iyab Issam Sakhnini, San Diego, CA (US); Hemant Saggar, Irvine, CA (US)

(73) Assignee: QUALCOMM Incorporated, San Diego, CA (US)

(*) Notice: Subject to any disclaimer, the term of this patent is extended or adjusted under 35 U.S.C. 154(b) by 502 days.

(21) Appl. No.: 17/316,669

(22) Filed: May 10, 2021

(65) Prior Publication Data

US 2022/0360401 A1     Nov. 10, 2022

(51) Int. Cl.
*H04L 5/00*          (2006.01)
*H04L 5/22*          (2006.01)

(52) U.S. Cl.
CPC .............. *H04L 5/0051* (2013.01); *H04L 5/22* (2013.01)

(58) Field of Classification Search
CPC .... H04B 7/0413; H04J 13/00; H04J 13/0003; H04L 27/2613; H04L 25/0226; H04L 27/2666; H04L 5/0016; H04L 5/0035; H04L 5/0048; H04L 5/0051; H04L 5/0091; H04W 72/042; H04W 76/27
See application file for complete search history.

(56) References Cited

U.S. PATENT DOCUMENTS

| | | | |
|---|---|---|---|
| 2015/0282158 A1 | 10/2015 | Chen et al. | |
| 2017/0086153 A1* | 3/2017 | Yoon ................... | H04W 56/001 |
| 2018/0331870 A1* | 11/2018 | Sun ..................... | H04L 27/2614 |
| 2019/0068308 A1* | 2/2019 | Shin ..................... | H04L 5/0048 |
| 2019/0158331 A1* | 5/2019 | Pawar ................. | H04L 27/2605 |

(Continued)

FOREIGN PATENT DOCUMENTS

WO          2020222605 A1     11/2020

OTHER PUBLICATIONS

International Search Report and Written Opinion—PCT/US2022/027626—ISA/EPO—Aug. 12, 2022.

(Continued)

*Primary Examiner* — Mansour Oveissi
(74) *Attorney, Agent, or Firm* — Paul M. McAdams; Procopio, Cory, Hargreaves & Savitch LLP

(57)          ABSTRACT

This disclosure provides systems, devices, apparatus, and methods, including computer programs encoded on storage media, for flexible intra-symbol multiplexing of DMRS of different antenna ports for single carrier waveforms. A base station may transmit one or more DMRSs within a symbol and provide an intra-symbol guard interval prior to each of the one or more DMRSs. The intra-symbol guard interval may have a duration that is based on a duration of a CP. A UE may receive the one or more demodulation reference signals DMRSs within the symbol based on the intra-symbol guard interval prior to each of the one or more DMRSs, and perform a channel estimation based on at least one of the one or more DMRSs.

28 Claims, 13 Drawing Sheets

(56) References Cited

U.S. PATENT DOCUMENTS

| | | |
|---|---|---|
| 2020/0287679 A1 | 9/2020 | Sun et al. |
| 2022/0217729 A1 | 7/2022 | Kim et al. |

OTHER PUBLICATIONS

Qualcomm Incorporated: "Views on DL DMRS", 3GPP TSG-RAN WG1 #87, R1-1612051, 3rd Generation Partnership Project, Mobile Competence Centre, 650, Route Des Lucioles, F-06921 Sophia-Antipolis Cedex, France, vol. RAN WG1, No. Reno, Nevada, USA, Nov. 14, 2016-Nov. 18, 2016, 7 Pages, Nov. 13, 2016, XP051176012, Section 5. DMRS Port Multiplexing, p. 6.

* cited by examiner

800

802

Transmit, within a symbol, one or more DMRSs

804

Provide an intra-symbol guard interval prior to each of the one or more DMRSs—the intra-symbol guard interval has a duration that is based on a duration of a CP

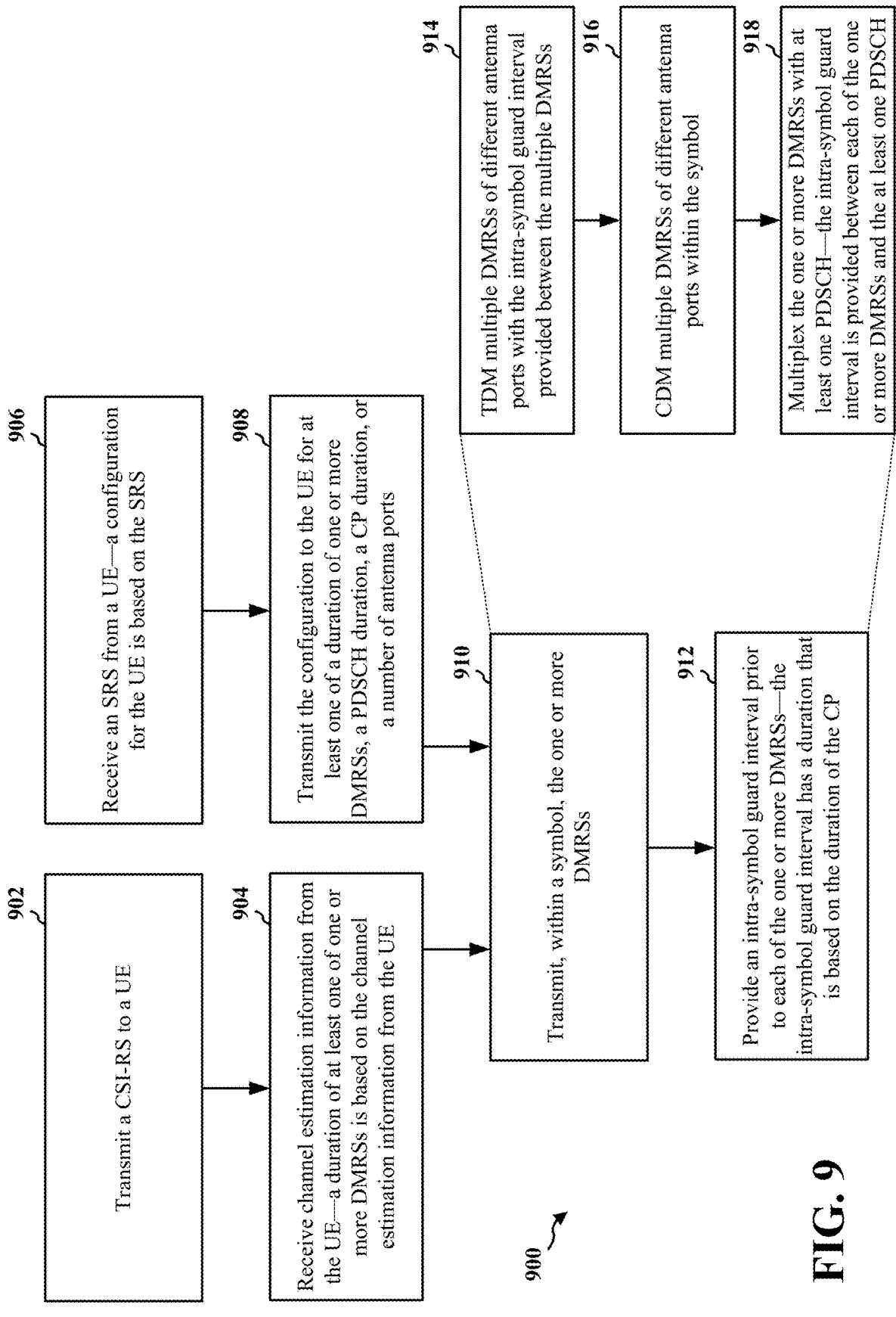

906 — Receive an SRS from a UE—a configuration for the UE is based on the SRS

908 — Transmit the configuration to the UE for at least one of a duration of one or more DMRSs, a PDSCH duration, a CP duration, or a number of antenna ports 914 — TDM multiple DMRSs of different antenna ports with the intra-symbol guard interval provided between the multiple DMRSs 916 — CDM multiple DMRSs of different antenna ports within the symbol 918 — Multiplex the one or more DMRSs with at least one PDSCH—the intra-symbol guard interval is provided between each of the one or more DMRSs and the at least one PDSCH 902 — Transmit a CSI-RS to a UE 904 — Receive channel estimation information from the UE—a duration of at least one of one or more DMRSs is based on the channel estimation information from the UE 910 — Transmit, within a symbol, the one or more DMRSs 912 — Provide an intra-symbol guard interval prior to each of the one or more DMRSs—the intra-symbol guard interval has a duration that is based on the duration of the CP

Receive one or more DMRSs within a symbol including an intra-symbol guard interval prior to each of the one or more DMRSs—the intra-symbol guard interval has a duration that is based on a duration of a CP

1004

Perform a channel estimation based on at least one of the one or more DMRSs

1000

FLEXIBLE INTRA-SYMBOL MULTIPLEXING OF DMRS OF DIFFERENT ANTENNA PORTS FOR SINGLE CARRIER WAVEFORM IN HIGHER BANDS

TECHNICAL FIELD

The present disclosure relates generally to communication systems, and more particularly, to flexible intra-symbol multiplexing of demodulation reference signal (DMRS) of different antenna ports for single carrier waveforms.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may transmit, within a symbol, one or more DMRSs; and provide an intra-symbol guard interval prior to each of the one or more DMRSs, the intra-symbol guard interval having a duration that is based on a duration of a CP.

In an aspect of the disclosure, a method, a computer-readable medium, and an apparatus are provided. The apparatus may receive one or more DMRSs within a symbol and having an intra-symbol guard interval prior to each of the one or more DMRSs, the intra-symbol guard interval having a duration that is based on a duration of a CP; and perform a channel estimation based on at least one of the one or more DMRS s.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 9 is a flowchart of a method of wireless communication at a base station.

DETAILED DESCRIPTION

Figure 1:
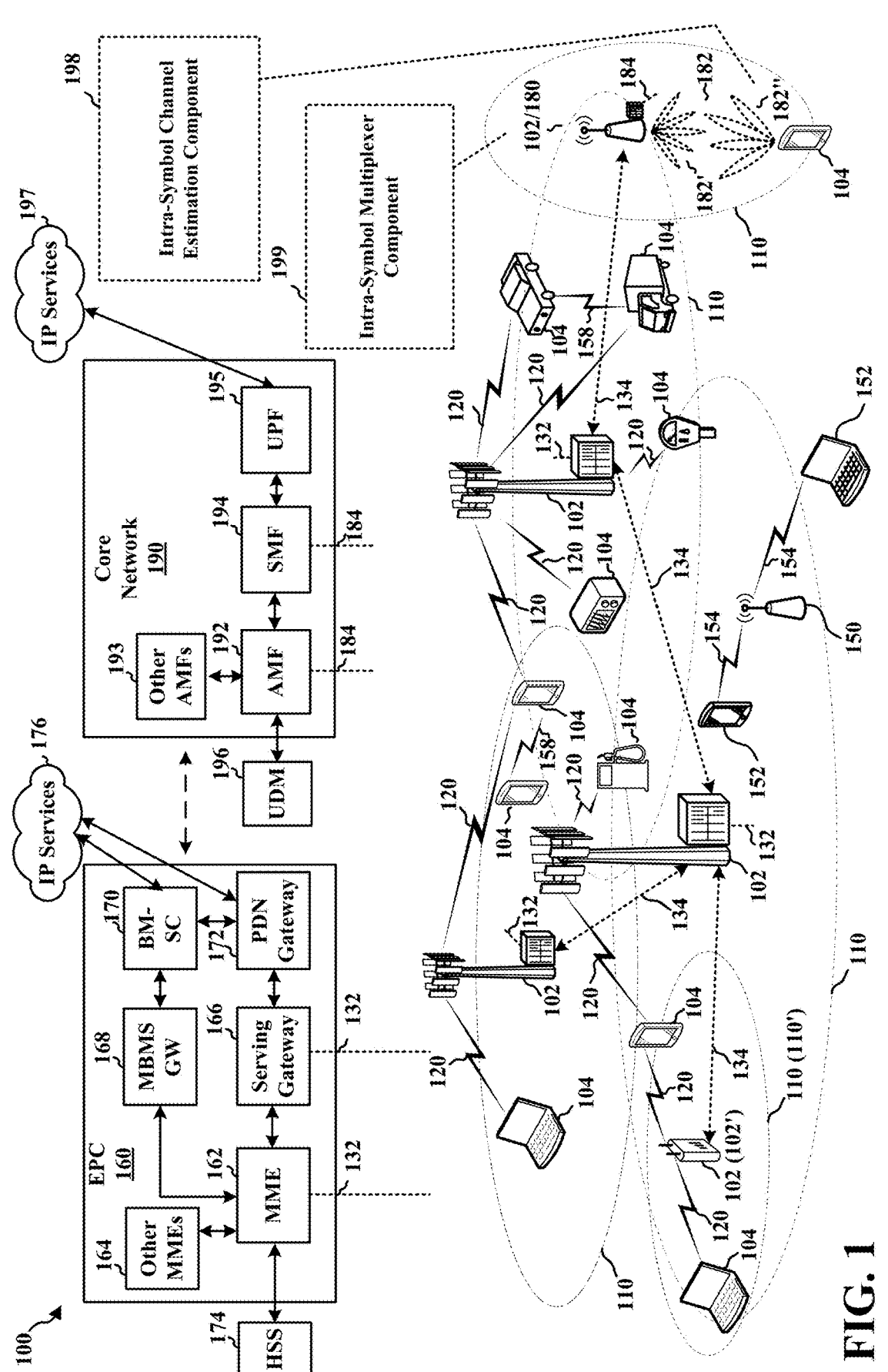
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include an intra-symbol channel estimation component 198 configured to receive one or more demodulation reference signals (DMRSs) within a symbol and having an intra-symbol guard interval prior to each of the one or more DMRSs, the intra-symbol guard interval having a duration that is based on a duration of a cyclic prefix (CP); and perform a channel estimation based on at least one of the one or more DMRSs. In certain aspects, the base station 180 may include an intra-symbol multiplexer component 199 configured to transmit, within a symbol, one or more DMRSs; and provide an intra-symbol guard interval prior to each of the one or more DMRSs, the intra-symbol guard interval having a duration that is based on a duration of a CP. Although the following description may be focused on 5G NR, the concepts described herein may be applicable to other similar areas, such as LTE, LTE-A, CDMA, GSM, and other wireless technologies.

Figures 2A, 2B, 2C, 2D:
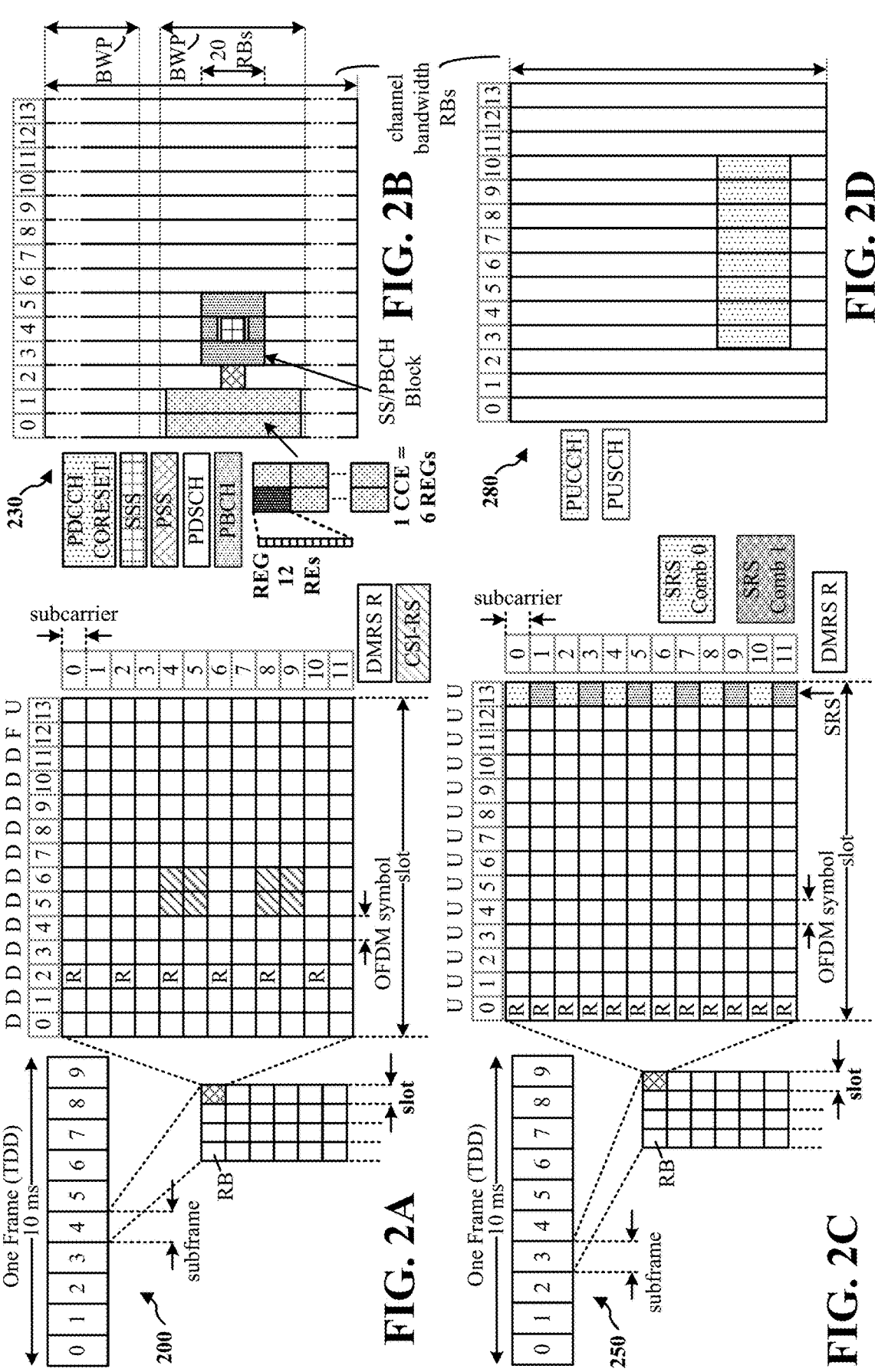
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on whether the CP is normal or extended. For normal CP, each slot may include 14 symbols, and for extended CP, each slot may include 7 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu \ast 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
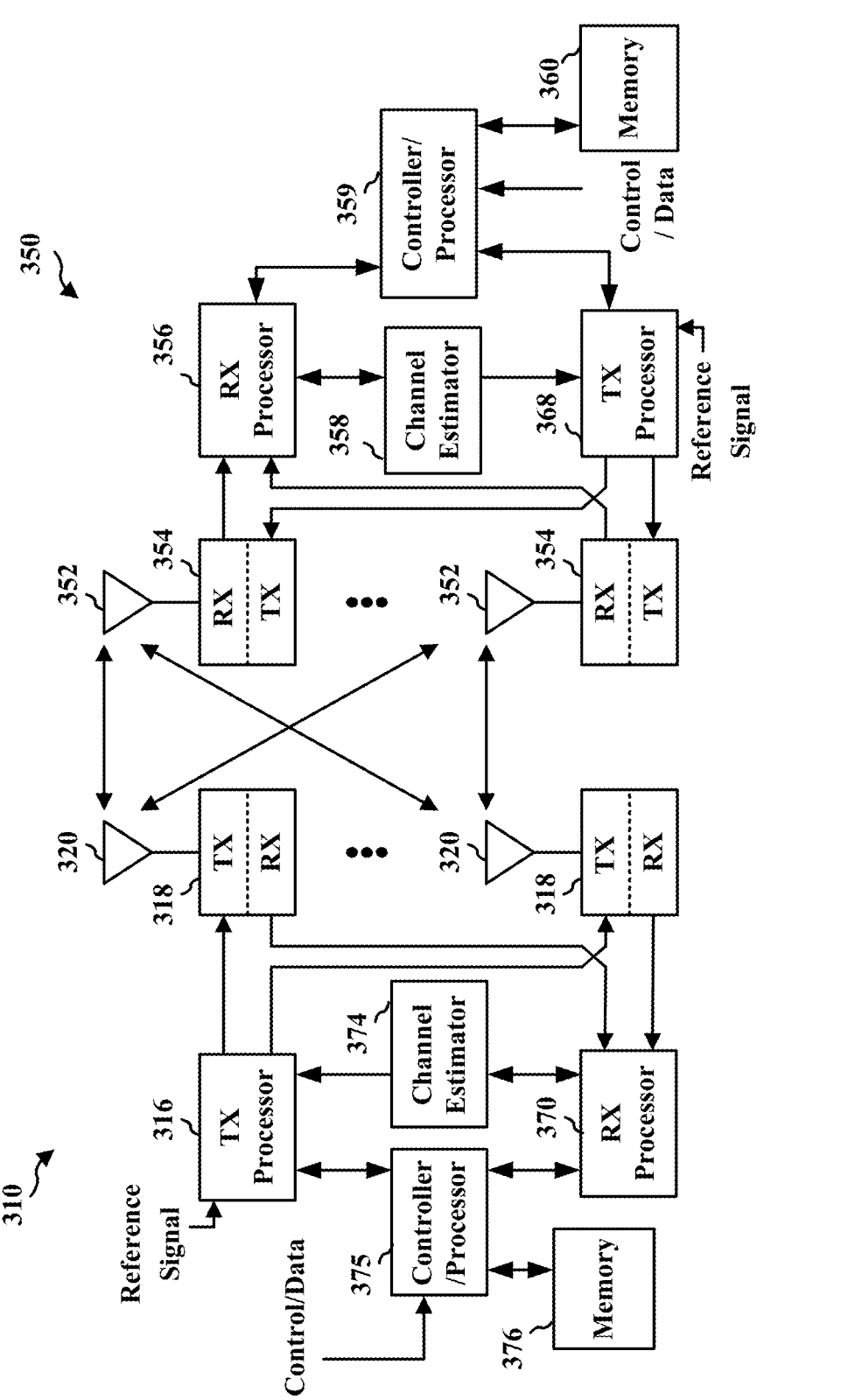
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the intra-symbol channel estimation component 198 of FIG. 1.

At least one of the TX processor 316, the RX processor 370, and the controller/processor 375 may be configured to perform aspects in connection with the intra-symbol multiplexer component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
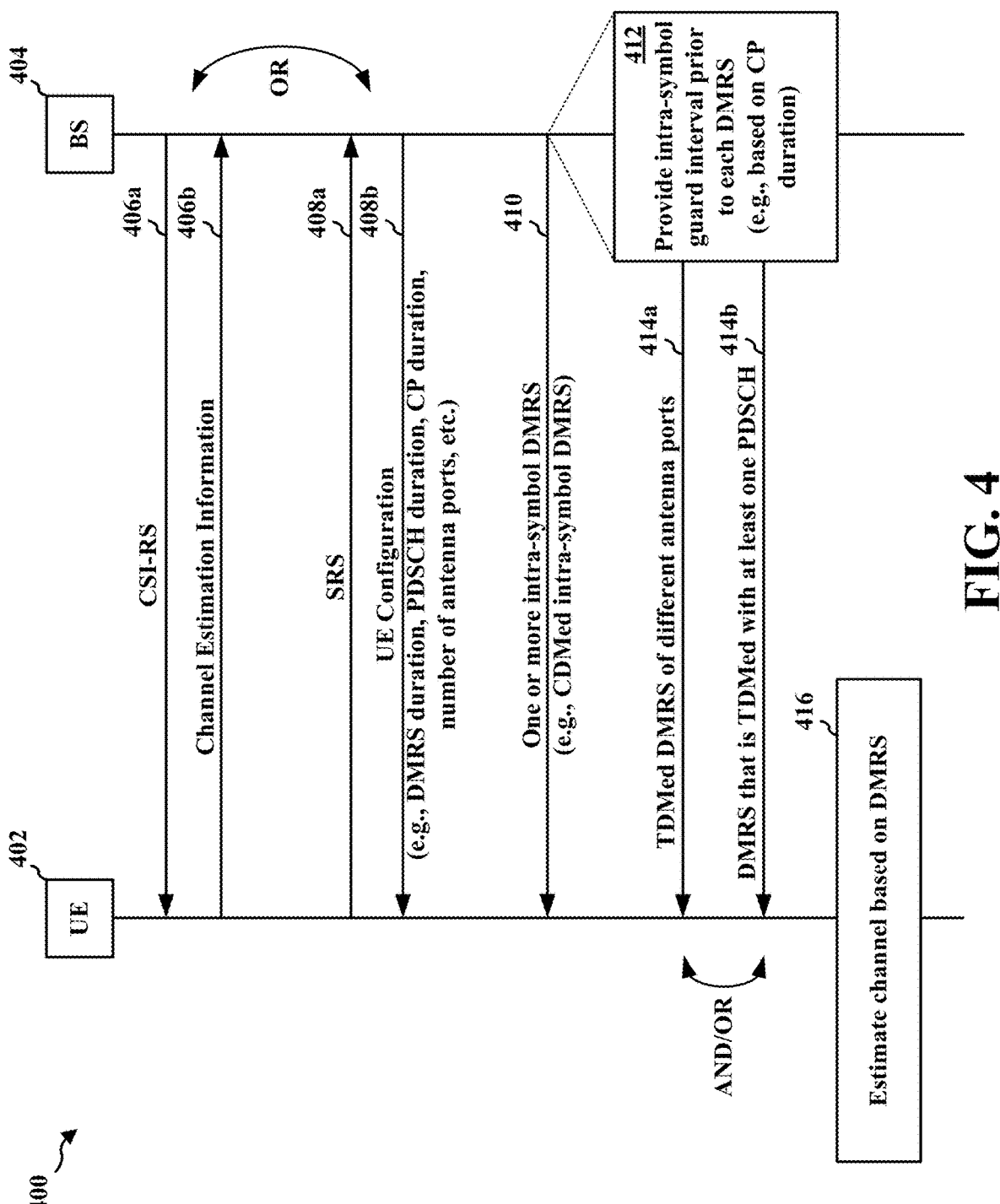
FIG. 4 is a call flow diagram illustrating communications between a UE and a base station.

FIG. 4 is a call flow diagram 400 illustrating communications between a UE 402 and a base station 404. In a first aspect, the base station 404 may transmit, at 406*a*, CSI-RS to the UE 402. The UE 402 may use the CSI-RS to estimate a channel and transmit, at 406*b*, channel estimation information associated with the estimated channel to the base station 404. In a second aspect, the UE 402 may transmit, at 408, SRS to the base station 404. The base station 404 may use the SRS to determine a UE configuration for the UE 402 and transmit, at 408*b*, the UE configuration to the UE 402. The UE configuration may be indicative of a DMRS duration, a PDSCH duration, a CP duration, a number of antenna ports, etc.

At 410, the base station 404 may transmit one or more intra-symbol DMRS to the UE 402. The DMRS transmitted, at 410, may be based on either the channel estimation information received, at 406b, by the base station 404 or the UE configuration transmitted, at 408b, to the UE 402. In some configurations, the one or more intra-symbol DMRS transmitted, at 410, to the UE 402 may include code division multiplexed (CDMed) intra-symbol DMRS, which may utilize a same antenna port.

At 412, the base station 404 may provide an intra-symbol guard interval prior to each DMRS (e.g., based on a CP duration for the symbol). A duration of the intra-symbol guard interval may be at least equal to or greater than the CP duration for the symbol. At 414a, the base station 404 may transmit time division multiplexed (TDMed) DMRS of different antenna ports to the UE 402. The TDMed DMRS transmitted, at 414a, may be TDMed within a same symbol. Additionally or alternatively, at 414b, the base station 404 may transmit DMRS that is TDMed with at least one PDSCH. The TDMed DMRS and PDSCH transmitted, at 414b, may be TDMed within a same symbol. At 416, the UE 402 may estimate the channel based on the DMRS received from the base station 404.

Figure 5:
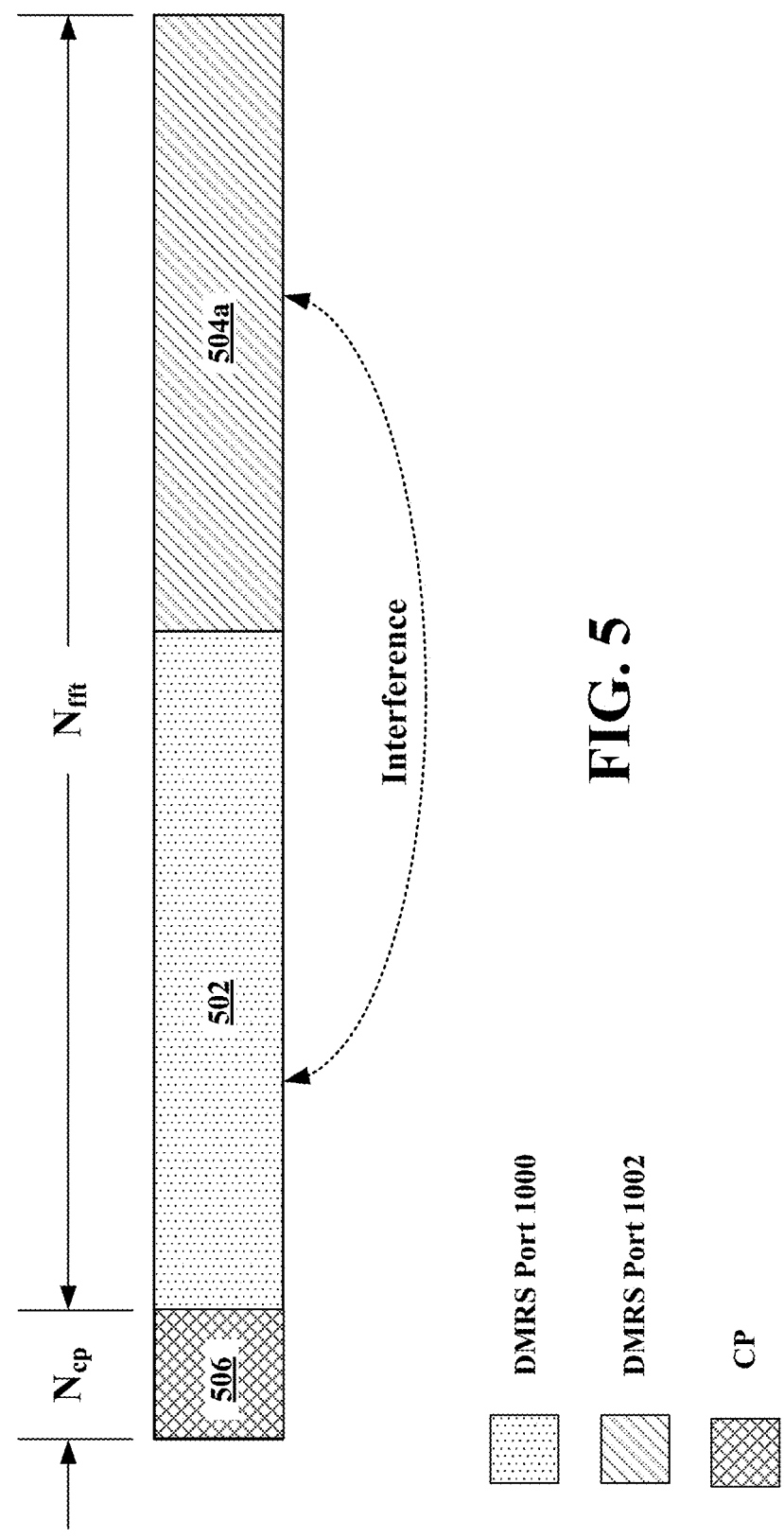
FIG. 5 is a diagram that illustrates intra-symbol multiplexing of demodulation reference signal (DMRS) of different antenna ports.

FIG. 5 is a diagram 500 that illustrates intra-symbol multiplexing of DMRS of different antenna ports. In high frequency ranges, such as frequency range (FR) 4, FR 5, etc., multi-carrier waveforms may be utilized to increase spectral efficiency. Multi-carrier waveforms may include OFDM-based waveforms. However, using such waveforms in association with high frequency ranges/frequency bands may result in decreased energy efficiency (e.g., for power amplifiers (PAs)) based on an increased peak to average power ratio (PAPR) of the waveforms. The decreased energy efficiency may be caused by non-linear processing effects of the high frequency ranges/frequency bands. In cases where energy efficiency requirements are more relaxed, multi-carrier waveforms, such as OFDM-based waveforms, may be used for providing spectral efficiency. OFDM-based waveforms may also be backward compatible with lower frequency ranges, such as FR1, FR2, FR2x, etc.

Single carrier waveforms may be similarly used for high frequency ranges, such as FR4, FR5, and other high frequency ranges. "Single carrier" may refer to a QAM signal that is not based on DFT precoded algorithms. Single carrier waveforms may be used for cases where energy efficiency requirements are more stringent, as single carrier waveforms may have a lower PAPR than multi-carrier waveforms. A decreased PAPR may correspond to an increased PA efficiency and/or an extended battery life for a device. In some cases, the decreased PAPR may provide improved coverage for the device. A UE may be a device associated with the more stringent energy efficiency requirements.

Single carrier waveforms may further provide an increased data rate based on an increased available spectrum size in the high frequency ranges. Thus, even though the spectral efficiency of single carrier waveforms may be less than the spectral efficiency of OFDM-based waveforms, a comparable data rate to a data rate of the OFDM-based waveforms may be provided by the single carrier waveforms based on the increased available spectrum size.

A CP 506 for a single carrier QAM signal may provide OFDM-like blocks or symbols for frequency domain equalization. That is, an end of a symbol may be appended to a beginning of the symbol to generate a cyclic structure (e.g., based on the $N_{cp}$ interval illustrated in the diagram 500). A guard interval (GI), which may also be referred to as a unique word (UW), may be applied to the symbol to perform aspects similar to aspects of the CP 506. FFT procedures and/or IFFT procedures may be performed at a receiver of a UE and/or base station to receive single carrier waveforms without significant changes to device hardware. Slot-level alignment may be performed between OFDM-based waveforms and singe carrier waveforms based on the cyclic structures of the waveforms. Thus, the slots/slot boundaries of the waveforms may be flexibly aligned. In some cases, symbol-level alignment may also be performed. A common numerology may be determined in association with sampling rates, FFT sizes (e.g., associated with the $N_{fft}$ interval in the diagram 500), etc., such that a same transceiver may be used for both the single carrier waveforms and the OFDM-based waveforms.

CP-OFDM waveforms and DFT-s-OFDM waveforms may be configured for multiplexing DMRS of different antenna ports in frequency domain and/or in code domain (e.g., for orthogonal cover codes). The multiplexed DMRS may include first DMRS 502, which may, in some examples, be associated with DMRS port 1000, and second DMRS 504, which may, in the same or different examples, be associated with DMRS port 1002. Multiplexing operations may be performed for channel estimation procedures. Resources may be allocated based on a time-frequency grid. If different DMRS resources are allocated to different antenna ports (e.g., antenna ports 1000, 1001, 1002, 1003, etc.), the different antenna ports may be multiplexed in the frequency domain based on frequency division multiplexing (FDM) in addition to CDM (e.g., for the orthogonal cover codes).

A configuration Type 1 and a configuration Type 2 may be indicative of different DMRS RE densities for the symbol, where Type 1 may refer to a 50% DMRS RE density within the symbol, and Type 2 may refer to a 33% RE density within the symbol. Based on the CP 506, the FDM and the CDM of the DMRS may ensure orthogonality between the DMRS, such as the first DMRS 502 and the second DMRS 504 of the different antenna ports. That is, the different antenna ports may not interfere with each other, which may allow the respective DMRS to be used for estimating the channel of the respective antenna ports and/or for equalizing the data without interference. Channel estimation for different antenna ports may be performed based on DMRS REs and assigned cover codes, followed by interpolation procedures indicative of each of the REs in a symbol of a RB.

Multiplexing DMRS of different antenna ports in the same symbol, such as the first DMRS 502 and the second DMRS 504, may be performed in association with single carrier waveforms that include a CP 506 or a GI. Both the CP 506 and the GI may generate a cyclic structure for the symbol, although the GI may not necessarily be positioned at a beginning of the symbol. The GI, which may be referred to as a gap interval, may correspond to a gap within the symbol where no data is transmitted/received. The gap interval may be associated with a different intra-symbol sequence than the CP 506. Single carrier waveforms may be based on at least one of CDM or TDM. TDM procedures that do not include a gap interval between the first DMRS 502 and the second DMRS 504 of a multi-path channel may include intra-symbol interference (ISI) between the first DMRS 502 and the second DMRS 504 based on the temporal proximity of the first DMRS 502 and the second DMRS 504 within the symbol.

A technique for avoiding interference between the first DMRS 502 and the second DMRS 504 of the different antenna ports in the same symbol may be to multiplex the first DMRS 502 and the second DMRS 504 at an inter-symbol level (e.g., the first DMRS 502 and the second DMRS 504 may be multiplexed based on different symbols, and not within the same symbol). For instance, if a slot includes 10 symbols, the first DMRS 502 and the second DMRS 504 of the different antenna ports may be multiplexed via distinct symbols of the slot. However, inter-symbol multiplexing may generate an overhead that reduces spectral efficiency. In some cases, the antenna ports may be multiplexed in code domain in addition to being multiplexed in time domain to reduce the overhead. If DMRS symbols are TDMed, the DMRS symbols may be front loaded, such that each symbol may be allocated to a unique antenna port. If the DMRS symbols are CDMed, which may be in addition to the DMRS symbols being TDMed, the DMRS symbols may be front loaded, such that each symbol may be allocated with CDMed DMRS of different antenna ports. Hence, a first symbol may be allocated 2 DMRS of different antenna ports that are multiplexed in a code domain, a second symbol may be allocated 2 more DMRS of different antenna ports that are also multiplexed in the code domain, where the 2 DMRS and the 2 more DMRS are further multiplexed in a time domain. While such techniques may provide a reduction in overhead, an allocation of the different DMRS, such as the first DMRS 502 and the second DMRS 504, on an inter-symbol level may not be suitable for some time varying wireless channels. For example, if the time varying wireless channel has a fast variation, channel estimations may be less efficient or less accurate.

Figure 6:
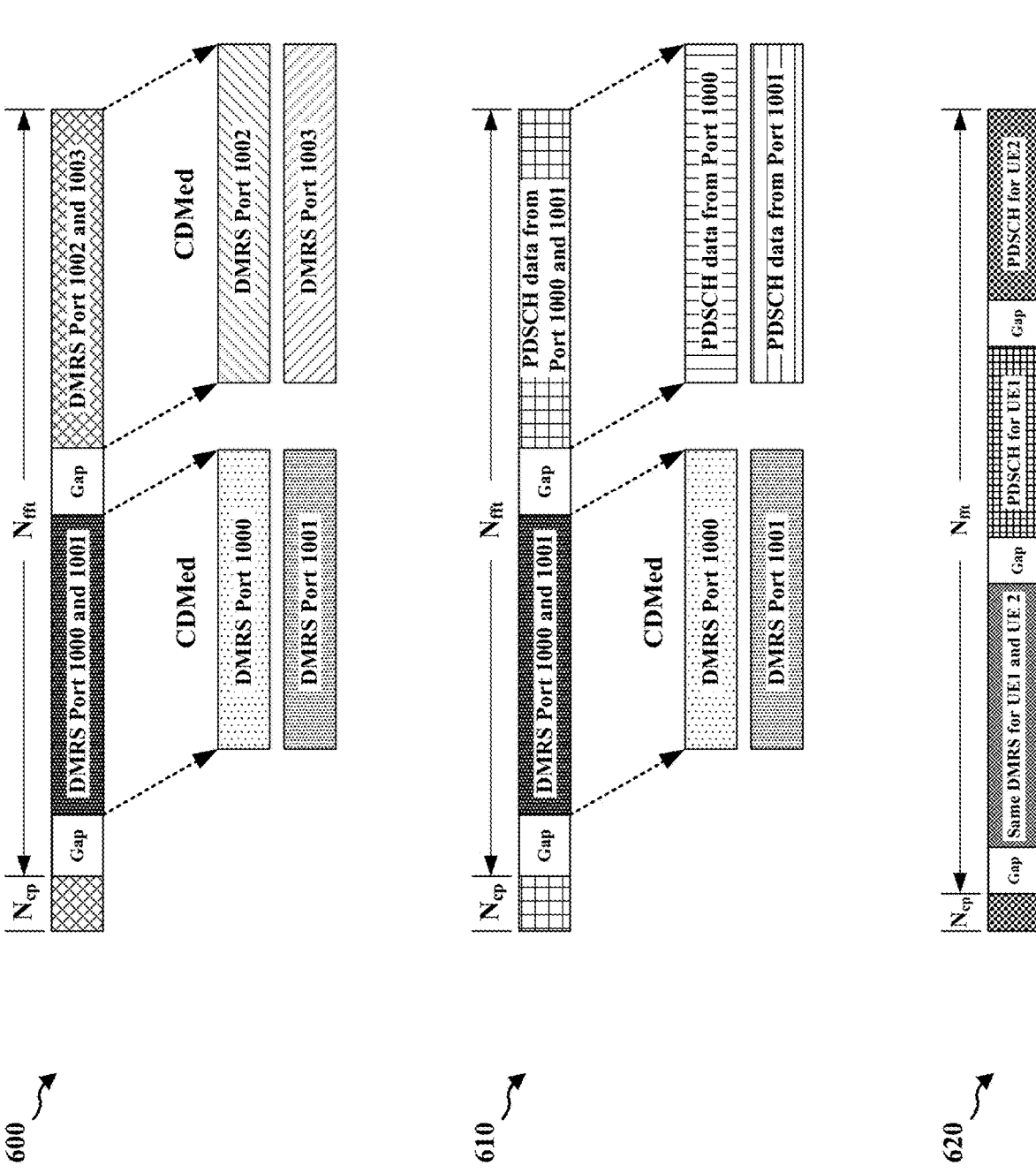
FIG. 6 includes diagrams that illustrate intra-symbol multiplexing based on a plurality of gap intervals.

FIG. 6 includes diagrams 600-620 that illustrate intra-symbol multiplexing based on a plurality of gap intervals. The plurality of gap intervals may be based on the cyclic structure of the CP (e.g., corresponding to $N_{cp}$ in the diagrams 600-620) for single carrier waveforms based on FFT (e.g., corresponding to $N_{fft}$ in the diagrams 600-620). The DMRS of different antenna ports may be multiplexed within the same symbol. While DMRS antenna ports 1000-1003 are illustrated in FIG. 6 for the intra-symbol multiplexing, one or more different antenna port numbers may be used in association with the techniques described herein.

The diagram 600 includes 4 DMRS transmitted based on 4 different antenna ports (e.g., antenna ports 1000, 1001, 1002, and 1003). Each of the antenna ports may be configured for a single UE or multiple UEs that share a same antenna port. Thus, certain antenna ports may be TDMed, so that the certain antenna ports do not interfere with each other via communications transmitted through the multi-path wireless channel. In the diagram 600, antenna port 1000 and antenna port 1001 are multiplexed in code domain, and antenna port 1002 and antenna port 1003 are also multiplexed in code domain. The CDMed sets of DMRS ports (e.g., first CDMed antenna ports 1000-1001 and second CDMed antenna ports 1002-1003) are further multiplexed in time domain, but are separated from each other based on a gap interval that is equal to or greater than a duration $N_{cp}$ that corresponds to the CP for the symbol. The $N_{cp}$ duration of the symbol may include a sub-symbol portion of the second CDMed set of DMRS (e.g., the CDMed DMRS from antenna port 1002 and antenna port 1003). Although the diagram 600 illustrates DMRS that are multiplexed based on a combination of CDM and TDM, the concept may be similarly applied for multiple DMRS based on a TDM pattern without CDM, such as the transmission of the DMRS for port 1000 that is TDM with the DMRS for port 1002 within a same symbol and separated by a gap interval. "Gap interval" may refer to a duration of time within the symbol where information is not communicated, e.g., transmitted, within the symbol. The gap interval may allow channel estimation to be performed based on the DMRS of a first port that does not interfere with/receive interference from the DMRS of a second port.

The DMRS of the different antenna ports may be of different durations within the symbol based on channel conditions. The duration of the DMRS may be configured to balance overhead with channel estimation accuracy. The duration of the DMRS of the different antenna ports may be configured independently (e.g., based on respective channel conditions). For example, the duration of a first DMRS of a first antenna port may have a different duration than a second DMRS of a second antenna port within a same symbol. Further, parameters associated with the CP, the DMRS, and the gap interval may be configured dynamically, statically, or semi-statically. In examples, the configuration may apply to more than two CDMed and TDMed DMRS antenna ports.

For uplink transmissions, the base station/network may signal the $N_{cp}$ duration of the CP, the DMRS duration, a number of antenna ports, and/or a duration of the gap interval to the UE. The base station may signal the information about the duration for the CP, DMRS, or gap interval to the UE in one or more of RRC signaling, a MAC-CE, or DCI, for example. The base station/network may determine the DMRS duration and the duration of the gap interval based on SRS received from the UE. A plurality of signaling techniques (e.g., for layer 1, layer 2, layer 3, etc.) may be performed based on aspects of the wireless channel. For example, layer 1 signaling, such as DCI communicated via PDCCH, may be used for fast time-varying wireless channels. For downlink transmissions, the UE may signal the DMRS duration, the number of antenna ports, and the duration of the gap interval to the base station/network. The UE may determine the DMRS duration, the number of antenna ports, and/or the duration of the gap interval based on CSI-RS received from the base station. The UE may signal parameters to the base station/network based on UCI communicated via PUCCH.

In the diagram 610, the first CDMed DMRS for antenna ports 1000-1001 may be TDMed within the symbol with other channels (e.g., PDSCH and/or PDCCH). For example, PDSCH data from antenna port 1000 and antenna port 1001 may be transmitted to a single UE or multiple UEs within a same symbol as the CDMed DMRS from antenna port 1000 and antenna port 1001. Accordingly, the DMRS from antenna port 1000 and antenna port 1001 may be CDMed and, based on a gap interval that follows the CDMed DMRS, PDSCH data from antenna port 1000 and antenna 1001 may be TDMed with the CDMed DMRS from antenna ports 1000-1001. The PDSCH transmissions may be transmitted to different UEs from different antenna ports at overlapping times without being CDMed. The gap interval may allow orthogonality to be maintained between sub-symbol PDSCH and sub-symbol DMRS after information associated with the entire symbol is communicated through the wireless channel. The gap interval may further allow channel estimation to be performed based on DMRS that does not interfere with/receive interference from the PDSCH or other channels. The durations of the DMRS and the PDSCH may be configured to balance overhead with channel estimation accuracy. The durations of the CP, the DMRS, the PDSCH, and the gap interval may be configured dynamically, statically, or semi-statically, e.g., in one or more of an RRC message, MAC-CE, or DCI.

In the diagram 620, multiple UEs may be scheduled within a same symbol (e.g., when the multiple UEs share a same beam/antenna port). That is, UE1 and UE2 may be scheduled on the same beam. In such configurations, different DMRS may not have to be transmitted for UE1 and UE2. Instead, UE1 and UE2 may be multiplexed on the same beam and share the same DMRS based on gap intervals positioned between the shared DMRS and each of the PDSCHs associated with UE1 and UE2. The gap intervals may allow channel estimation to be performed based on DMRS that does not interfere with/receive interference from PDSCHs or other channels. The durations of the DMRS and the PDSCHs may be configured to balance overhead with channel estimation accuracy. The durations of the CP, the DMRS, the PDSCHs, and the gap interval may be configured dynamically, statically, or semi-statically.

Figure 7:
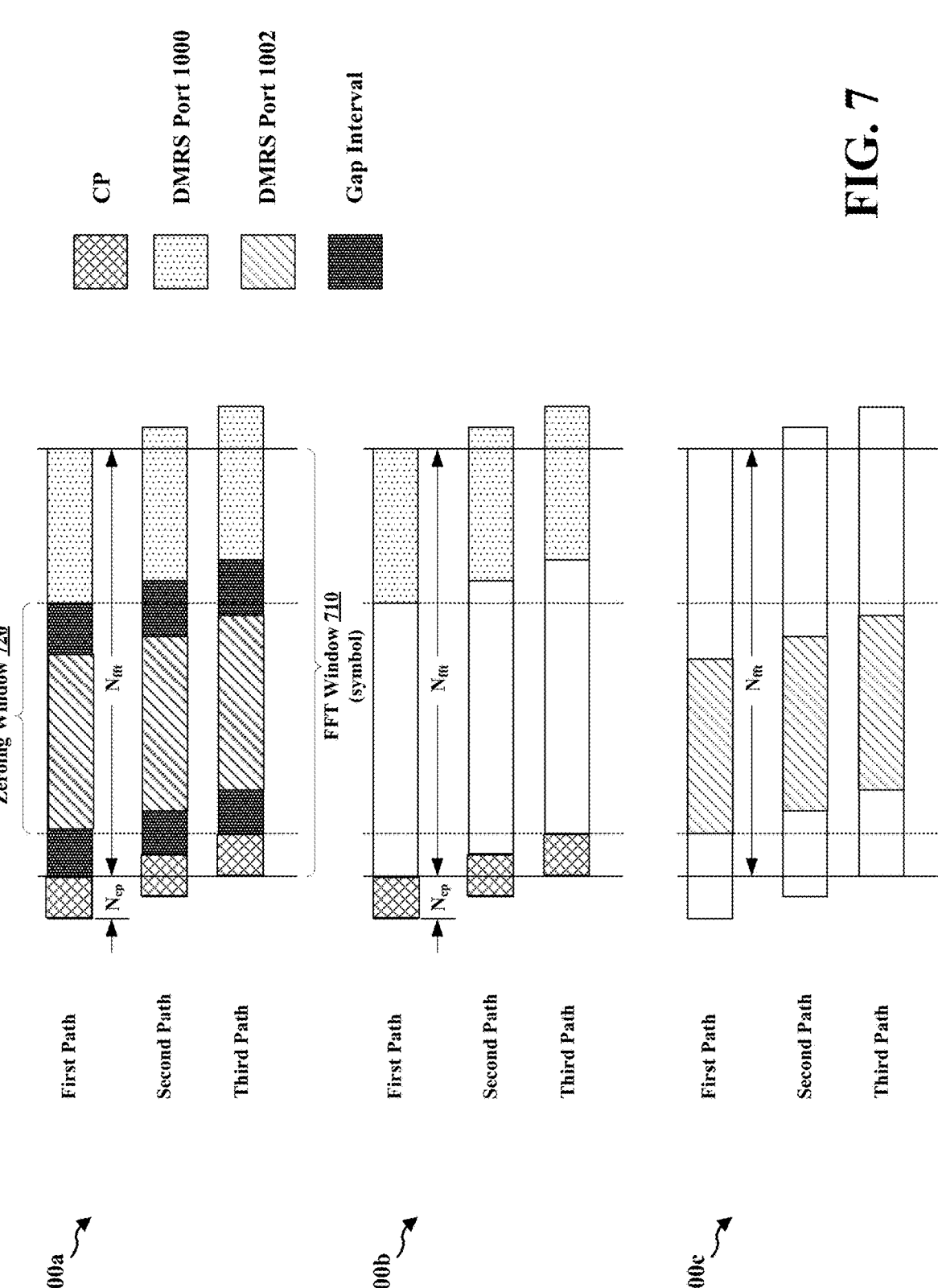
FIG. 7 includes diagrams that illustrate an example channel estimation technique.

FIG. 7 includes diagrams 700a-700c that illustrate an example channel estimation technique. A UE or a base station may receive, via the multi-path wireless channel, a signal for frequency domain processing that includes a first path, a second path, and a third path. While FIG. 7 illustrates that DMRS port 1000 and DMRS port 1002 are TDMed, other DMRS ports included in other configurations may also be separately CDMed in combination with the respective TDMed DMRS ports 1000 and 1002, one or more PDSCHs, and/or one or more other channels.

The received signal may be associated with an FFT window 710 (e.g., corresponding to $N_{fft}$) and a zeroing window 720. In some aspects, the FFT window may correspond to, or be based on, a symbol. The DMRS of port 1000 that precedes the zeroing window 720 may correspond to the CP for the symbol. The CP may include a duration of $N_{cp}$. The information included in the symbol may be delayed and/or weighted by a gain of a wireless channel tap associated with the delay based on communication of the information through the wireless channel. Given that the duration of the CP may be at least as long as a maximum delay spread of the channel, the cyclic structure of the symbol may be maintained for performing frequency domain equalization.

In order to determine the DMRS of port 1000, the DMRS of port 1002 may be cancelled via a zeroing procedure performed within the zeroing window 720. Cancelling the DMRS of port 1002 may ensure that the DMRS of the two ports (e.g., DMRS port 1000 and DMRS port 1002) do not interfere with each other when the UE or the base station determines channel/equalizer coefficients in the frequency domain for remaining DMRS located outside the zeroing window 720 (e.g., the DMRS of port 1000 in this example). The determined coefficients may be indicative of channel conditions experienced by the DMRS of port 1000.

A similar procedure may be performed to determine the DMRS of port 1002 based on cancelling the DMRS of port 1000 via a zeroing procedure performed outside the zeroing window 720. In such cases, the UE or the base station may determine the channel/equalizer coefficients for the remaining DMRS located within the zeroing window 720 (e.g., for the DMRS of port 1002), which may be indicative of channel conditions experienced by the DMRS of port 1002. Similar techniques may likewise be performed with respect to PDSCH and other channels.

Based on zeroing the DMRS of port 1000 or the DMRS of port 1002, channel estimation may be performed in the time domain, as the cyclic structure of the symbol is maintained after the zeroing procedure is performed. Time domain procedures may be based on a circular correlation using a determined DMRS sequence. Frequency domain procedures based on the circular structure may be performed using a same size FFT window 710. The equalizer coefficient may be determined via the time domain or the frequency domain based on the corresponding channel estimation techniques.

Figure 8:
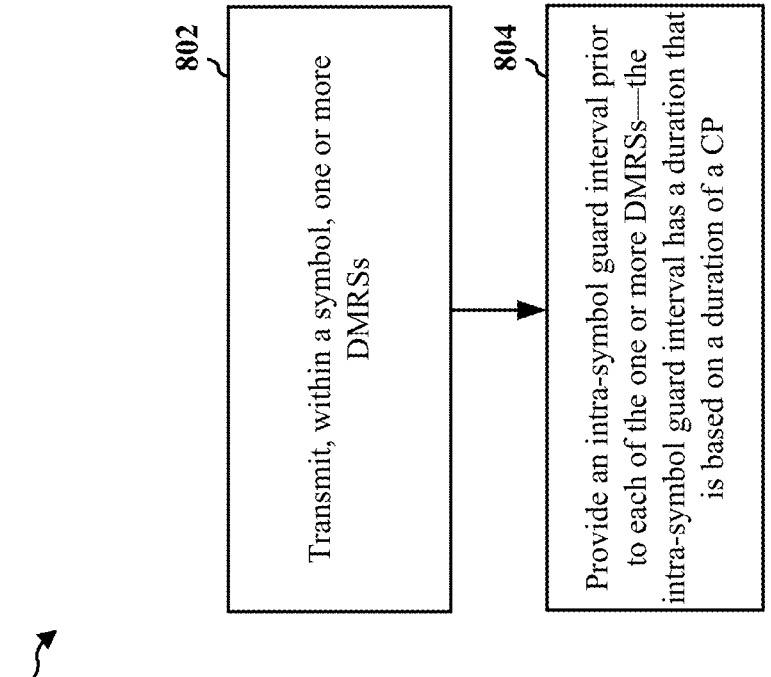
FIG. 8 is a flowchart of a method of wireless communication at a base station.

FIG. 8 is a flowchart 800 of a method of wireless communication. The method may be performed by a base station (e.g., the base station 102/404; the apparatus 1202; etc.), which may include the memory 376 and which may be the entire base station 102/404 or a component of the base station 102/404, such as the TX processor 316, the RX processor 370, and/or the controller/processor 375.

At 802, the base station may transmit, within a symbol, one or more DMRSs. For example, referring to FIGS. 4-7, the base station 404 may transmit, at 410, one or more intra-symbol DMRS to the UE 402. In the diagram 500, first DMRS 502 associated with DMRS port 1000 and second DMRS 504 associated with DMRS port 1002 may be transmitted within the same symbol (e.g., within the $N_{fft}$ interval of the same symbol). Further, the diagrams 600-620 each illustrate one or more DMRSs being transmitted within the same symbol. In the diagram 700a, DMRS from port 1000 and DMRS from port 1002 are transmitted within the same symbol. The transmission, at 802, may be performed by the multiplexer component 1240 of the apparatus 1202 in FIG. 12.

At 804, the base station may provide an intra-symbol guard interval prior to each of the one or more DMRSs—the intra-symbol guard interval has a duration that is based on a duration of a CP. For example, referring to FIGS. 4 and 6-7, the base station 404 may provide, at 412, an intra-symbol guard interval (e.g., based on a CP duration) prior to each DMRS. In the diagrams 600-620, a gap interval that is equal to or greater than the $N_{cp}$ duration of the CP for the symbol may be provided prior to each set of DMRS (e.g., the DMRS from ports 1000-1001, the DMRS from ports 1002-1003, the same DMRS for UE1 and UE2, etc.). In the diagrams 700a-700c, the gap interval is provided prior to each of the DMRS from port 1000 and the DMRS from port 1001. The providing, at 804, may be performed by the provisioning component 1242 of the apparatus 1202 in FIG. 12.

FIG. 9 is a flowchart 900 of a method of wireless communication. The method may be performed by a base station (e.g., the base station 102/404; the apparatus 1202; etc.), which may include the memory 376 and which may be the entire base station 102/404 or a component of the base station 102/404, such as the TX processor 316, the RX processor 370, and/or the controller/processor 375.

At 902, the base station may transmit a CSI-RS to a UE. For example, referring to FIG. 4, the base station 404 may transmit, at 406a, a CSI-RS to the UE 402. The transmission, at 902, may be performed by the transmission component 1234 of the apparatus 1202 in FIG. 12.

At 904, the base station may receive channel estimation information from the UE—a duration of at least one of one or more DMRSs is based on the channel estimation information from the UE. For example, referring to FIG. 4, the base station 404 may receive, at 406b, channel estimation information from the UE 402. The reception, at 904, may be performed by the reception component 1230 of the apparatus 1202 in FIG. 12.

At 906, the base station may alternatively receive an SRS from a UE—a configuration for the UE is based on the SRS. For example, referring to FIG. 4, the base station 404 may receive, at 408a, an SRS from the UE 402. The reception, at 906, may be performed by the reception component 1230 of the apparatus 1202 in FIG. 12.

At 908, the base station may transmit the configuration to the UE for at least one of a duration of one or more DMRSs, a PDSCH duration, a CP duration, or a number of antenna ports. For example, referring to FIGS. 4 and 6, the base station 404 may transmit, at 408b, a UE configuration to the UE 402. The UE configuration transmitted, at 408*b*, may be indicative of a DMRS duration, a PDSCH duration, a CP duration, a number of antenna ports, etc., and may be a dynamic configuration, a static configuration, or a semi-static configuration. In examples, a first duration of a first DMRS in the symbol (e.g., DMRS ports 1000-1001 in the diagram 600) may be configured independently from a second duration of a second DMRS in the symbol (e.g., DMRS ports 1002-1003 in the diagram 600), where the first duration of the DMRS and the second duration of the DMRS are based on respective channel conditions for each corresponding antenna port(s). The transmission, at 908, may be performed by the transmission component 1234 of the apparatus 1202 in FIG. 12.

At 910, the base station may transmit, within a symbol, the one or more DMRSs (e.g., based on either 902-904 or 906-908). For example, referring to FIGS. 4-7, the base station 404 may transmit, at 410, one or more intra-symbol DMRS to the UE 402. In the diagram 500, first DMRS 502 associated with DMRS port 1000 and second DMRS 504 associated with DMRS port 1002 may be transmitted within the same symbol (e.g., within the $N_{fft}$ interval of the same symbol). Further, the diagrams 600-620 each illustrate one or more DMRSs being transmitted within the same symbol. In the diagram 700*a*, DMRS from port 1000 and DMRS from port 1002 are transmitted within the same symbol. The transmission, at 910, may be performed by the multiplexer component 1240 of the apparatus 1202 in FIG. 12.

At 912, the base station may provide an intra-symbol guard interval prior to each of the one or more DMRSs—the intra-symbol guard interval has a duration that is based on the duration of the CP. For example, referring to FIGS. 4 and 6-7, the base station 404 may provide, at 412, an intra-symbol guard interval (e.g., based on a CP duration) prior to each DMRS. In the diagrams 600-620, a gap interval that is equal to or greater than the $N_{cp}$ duration of the CP for the symbol may be provided prior to each set of DMRS (e.g., the DMRS from ports 1000-1001, the DMRS from ports 1002-1003, the same DMRS for UE1 and UE2, etc.). In the diagrams 700*a*-700*c*, the gap interval is provided prior to each of the DMRS from port 1000 and the DMRS from port 1001. The duration of the intra-symbol guard interval (e.g., the gaps illustrated in diagrams 600-620) for the symbol may be equal to or greater than the duration of the CP (e.g., $N_{cp}$ duration) for the symbol. The duration of each of the one or more DMRSs may be based on a corresponding channel condition for the UE 402. The providing, at 912, may be performed by the provisioning component 1242 of the apparatus 1202 in FIG. 12.

At 914, the base station may TDM multiple DMRSs of different antenna ports with the intra-symbol guard interval provided between the multiple DMRSs. For example, referring to FIGS. 4 and 6-7. The base station 404 may transmit, at 414*a*, TDMed DMRS of different antenna ports to the UE 402 based on providing, at 412, the guard interval prior to each DMRS. The diagram 600 illustrates a gap provided between a first set of DMRS (e.g., associated with ports 1000-1001) that is TDMed with a second set of DMRS (e.g., associated with ports 1002-1003). The diagram 700*a* similarly illustrates a gap interval between DMRS port 1000 and DMRS port 1002, which are TDMed within the same symbol. The TDM, at 914, may be performed by the multiplexer component 1240 of the apparatus 1202 in FIG. 12.

At 916, the base station may CDM multiple DMRSs of different antenna ports within the symbol. For example, referring to FIGS. 4 and 6, the base station 404 may CDM the intra-symbol DMRS transmitted, at 410, to the UE 402. The diagrams 600-620 similarly illustrate CDMed DMRS, which corresponds to the DMRS from ports 1000-1001, the DMRS from ports 1002-1003, and the same DMRS for UE1 and UE2. The multiplexing, at 916, may be performed by the multiplexer component 1240 of the apparatus 1202 in FIG. 12.

At 918, the base station may multiplex the one or more DMRSs with at least one PDSCH—the intra-symbol guard interval is provided between each of the one or more DMRSs and the at least one PDSCH. For example, referring to FIGS. 4 and 6, the base station 404 may transmit, at 414*b*, DMRS that is TDMed with at least one PDSCH. The diagrams 610-620 further illustrate a gap provided between the DMRS and at least one PDSCH transmission. In examples, the base station 404 may TDM a plurality of PDSCHs associated with a same DMRS (e.g., as illustrated in the diagram 620), where the intra-symbol guard interval (e.g., gap) is provided between each of the plurality of PDSCHs (e.g., the PDSCH for UE1 and the PDSCH for UE2). The multiplexing, at 918, may be performed by the multiplexer component 1240 of the apparatus 1202 in FIG. 12.

Figure 10:
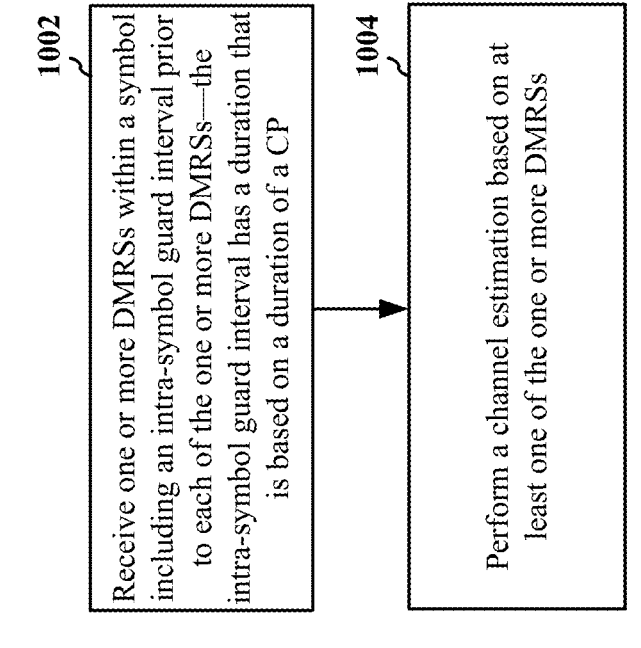
FIG. 10 is a flowchart of a method of wireless communication at a UE.

FIG. 10 is a flowchart 1000 of a method of wireless communication. The method may be performed by a UE (e.g., the UE 104/402; the apparatus 1302; etc.), which may include the memory 360 and which may be the entire UE 104/402 or a component of the UE 104/402, such as the TX processor 368, the RX processor 356, and/or the controller/processor 359.

At 1002, the UE may receive one or more DMRSs within a symbol including an intra-symbol guard interval prior to each of the one or more DMRSs—the intra-symbol guard interval has a duration that is based on a duration of a CP. For example, referring to FIGS. 4-7, the UE 402 may receive, at 410, one or more intra-symbol DMRS from the base station 404. In the diagram 500, first DMRS 502 associated with DMRS port 1000 and second DMRS 504 associated with DMRS port 1002 may be transmitted within the same symbol (e.g., within the $N_{fft}$ interval of the same symbol). Further, the diagrams 600-620 each illustrate one or more DMRSs being transmitted within the same symbol. In the diagram 700*a*, DMRS from port 1000 and DMRS from port 1002 are transmitted within the same symbol. An intra-symbol guard interval (e.g., based on a CP duration) may be included prior to each DMRS (e.g., based on 412). In the diagrams 600-620, a gap interval that is equal to or greater than the $N_{cp}$ duration of the CP for the symbol may be included prior to each set of DMRS (e.g., the DMRS from ports 1000-1001, the DMRS from ports 1002-1003, the same DMRS for UE1 and UE2, etc.). In the diagrams 700*a*-700*c*, the gap interval is included prior to each of the DMRS from port 1000 and the DMRS from port 1001. The reception, at 1002, may be performed by the multiplexer component 1340 of the apparatus 1302 in FIG. 13.

At 1004, the UE may perform a channel estimation based on at least one of the one or more DMRSs. For example, referring to FIGS. 4 and 7, the UE 402 may estimate, at 416, a channel based on the DMRS. In the diagram 700*b*, the channel may be estimated based on the DMRS from port 1000. In the diagram 700*c*, the channel may be estimated based on the DMRS from port 1002. The performance, at 1004, may be performed by the performance component 1342 of the apparatus 1302 in FIG. 13.

Figure 11:
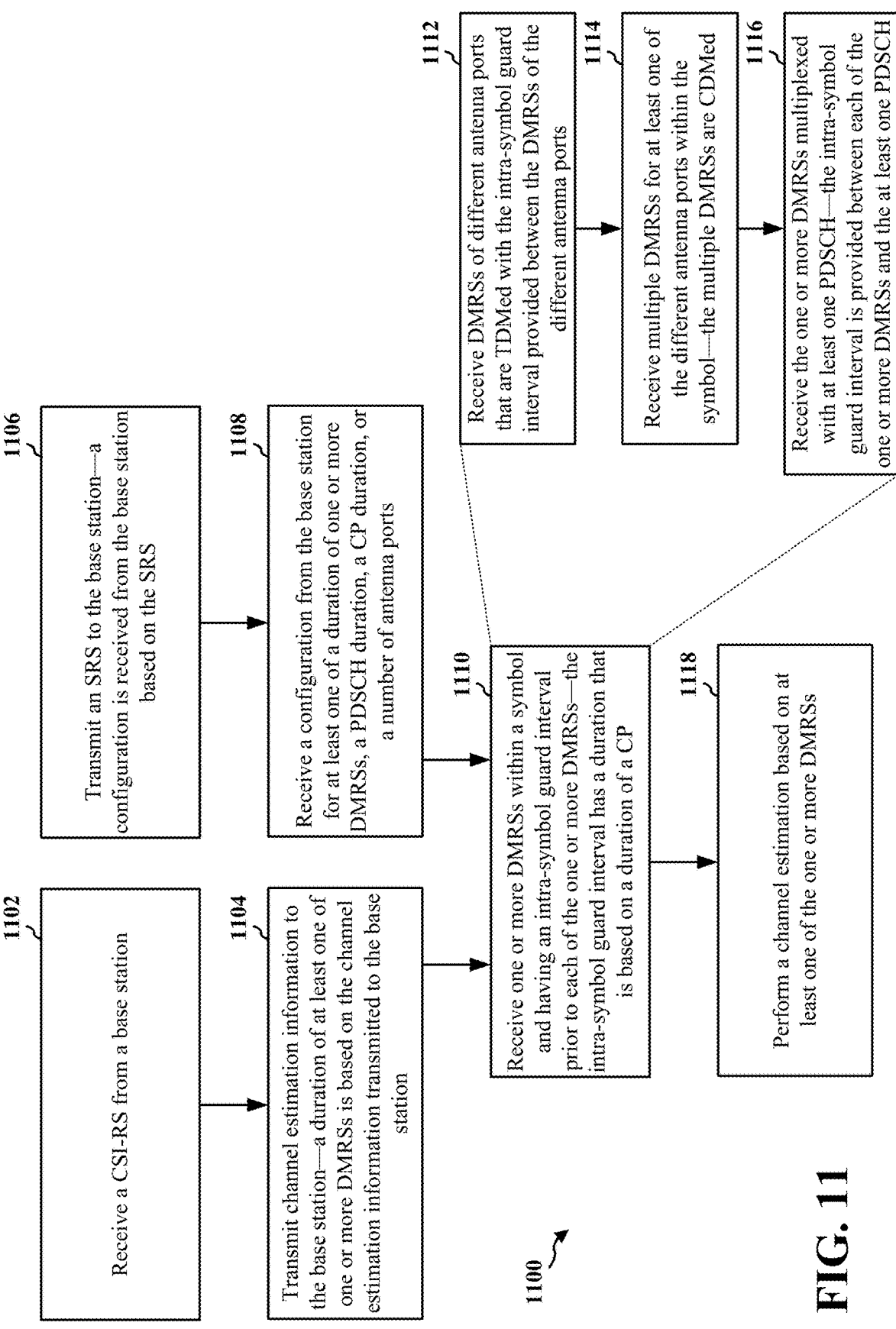
FIG. 11 is a flowchart of a method of wireless communication at a UE.

FIG. 11 is a flowchart 1100 of a method of wireless communication. The method may be performed by a UE (e.g., the UE 104/402; the apparatus 1302; etc.), which may include the memory 360 and which may be the entire UE 104/402 or a component of the UE 104/402, such as the TX processor 368, the RX processor 356, and/or the controller/processor 359.

At 1102, the UE may receive a CSI-RS from a base station. For example, referring to FIG. 4, the UE 402 may receive, at 406a, a CSI-RS from the base station 404. The reception, at 1102, may be performed by the reception component 1330 of the apparatus 1302 in FIG. 13.

At 1104, the UE may transmit channel estimation information to the base station—a duration of at least one of one or more DMRSs is based on the channel estimation information transmitted to the base station. For example, referring to FIG. 4, the UE 402 may transmit, at 406b, channel estimation information to the base station 404. The transmission, at 1104, may be performed by the transmission component 1334 of the apparatus 1302 in FIG. 13.

At 1106, the UE may alternatively transmit an SRS to the base station—a configuration is received from the base station based on the SRS. For example, referring to FIG. 4, the UE 402 may transmit, at 408a, an SRS to the base station 404. The transmission, at 1106, may be performed by the transmission component 1334 of the apparatus 1302 in FIG. 13.

At 1108, the UE may receive a configuration from the base station for at least one of a duration of one or more DMRSs, a PDSCH duration, a CP duration, or a number of antenna ports. For example, referring to FIGS. 4 and 6, the UE 402 may receive, at 408b, a UE configuration from the base station 404. The UE configuration received, at 408b, may be indicative of a DMRS duration, a PDSCH duration, a CP duration, a number of antenna ports, etc., and may be a dynamic configuration, a static configuration, or a semi-static configuration. In examples, a first duration of a first DMRS in the symbol (e.g., DMRS ports 1000-1001 in the diagram 600) may be configured independently from a second duration of a second DMRS in the symbol (e.g., DMRS ports 1002-1003 in the diagram 600), where the first duration of the first DMRS and the second duration of the second DMRS are based on respective channel conditions for each corresponding antenna port(s). The reception, at 1108, may be performed by the reception component 1330 of the apparatus 1302 in FIG. 13.

At 1110, the UE may receive one or more DMRSs within a symbol and having an intra-symbol guard interval prior to each of the one or more DMRSs—the intra-symbol guard interval has a duration that is based on a duration of a CP (e.g., based on either 1102-1104 or 1106-1108). For example, referring to FIGS. 4-7, the UE 402 may receive, at 410, one or more intra-symbol DMRS from the base station 404. In the diagram 500, first DMRS 502 associated with DMRS port 1000 and second DMRS 504 associated with DMRS port 1002 may be transmitted within the same symbol (e.g., within the $N_{ft}$ interval of the same symbol). Further, the diagrams 600-620 each illustrate one or more DMRSs being transmitted within the same symbol. In the diagram 700a, DMRS from port 1000 and DMRS from port 1002 are transmitted within the same symbol. An intra-symbol guard interval (e.g., based on a CP duration) may be included prior to each DMRS (e.g., based on 412). In the diagrams 600-620, a gap interval that is equal to or greater than the $N_{cp}$ duration of the CP for the symbol may be included prior to each set of DMRS (e.g., the DMRS from ports 1000-1001, the DMRS from ports 1002-1003, the same DMRS for UE1 and UE2, etc.). In the diagrams 700a-700c, the gap interval is included prior to each of the DMRS from port 1000 and the DMRS from port 1001. The duration of the intra-symbol guard interval (e.g., the gaps illustrated in diagrams 600-620) for the symbol may be equal to or greater than the duration of the CP (e.g., $N_{cp}$ duration) for the symbol. The duration of each of the one or more DMRSs may be based on a corresponding channel condition associated with an antenna port. The reception, at 1110, may be performed by the multiplexer component 1340 of the apparatus 1302 in FIG. 13.

At 1112, the UE may receive DMRSs of different antenna ports that are TDMed with the intra-symbol guard interval provided between the DMRSs of the different antenna ports. For example, referring to FIGS. 4 and 6-7. The UE 402 may receive, at 414a, TDMed DMRS of different antenna ports from the base station 404 based on the guard interval provided, at 412, prior to each DMRS. The diagram 600 illustrates a gap provided between a first set of DMRS (e.g., associated with ports 1000-1001) that is TDMed with a second set of DMRS (e.g., associated with ports 1002-1003). The diagram 700a similarly illustrates a gap interval between DMRS port 1000 and DMRS port 1002, which are TDMed within the same symbol. The reception, at 1112, may be performed by the multiplexer component 1340 of the apparatus 1302 in FIG. 13.

At 1114, the UE may receive multiple DMRSs for at least one of the different antenna ports within the symbol—the multiple DMRSs are CDMed. For example, referring to FIGS. 4 and 6, the one or more intra-symbol DMRS received, at 410, from the base station 404 may include CDMed intra-symbol DMRS. The diagrams 600-620 similarly illustrate CDMed DMRS, which corresponds to the DMRS from ports 1000-1001, the DMRS from ports 1002-1003, and the same DMRS for UE1 and UE2. The reception, at 1114, may be performed by the multiplexer component 1340 of the apparatus 1302 in FIG. 13.

At 1116, the UE may receive the one or more DMRSs multiplexed with at least one PDSCH—the intra-symbol guard interval is provided between each of the one or more DMRSs and the at least one PDSCH. For example, referring to FIGS. 4 and 6, the UE 402 may receive, at 414b, DMRS that is TDMed with at least one PDSCH. The diagrams 610-620 further illustrate a gap provided between the DMRS and at least one PDSCH transmission. In examples, a plurality of PDSCHs is TDMed with a same DMRS (e.g., as illustrated in the diagram 620), where the intra-symbol guard interval (e.g., gap) is provided between each of the plurality of PDSCHs (e.g., the PDSCH for UE1 and the PDSCH for UE2). The reception, at 1116, may be performed by the multiplexer component 1340 of the apparatus 1302 in FIG. 13.

At 1118, the UE may perform a channel estimation based on at least one of the one or more DMRSs. For example, referring to FIGS. 4 and 7, the UE 402 may estimate, at 416, a channel based on the DMRS. In the diagram 700b, the channel may be estimated based on the DMRS from port 1000. In the diagram 700c, the channel may be estimated based on the DMRS from port 1002. The performance, at 1118, may be performed by the performance component 1342 of the apparatus 1302 in FIG. 13.

Figure 12:
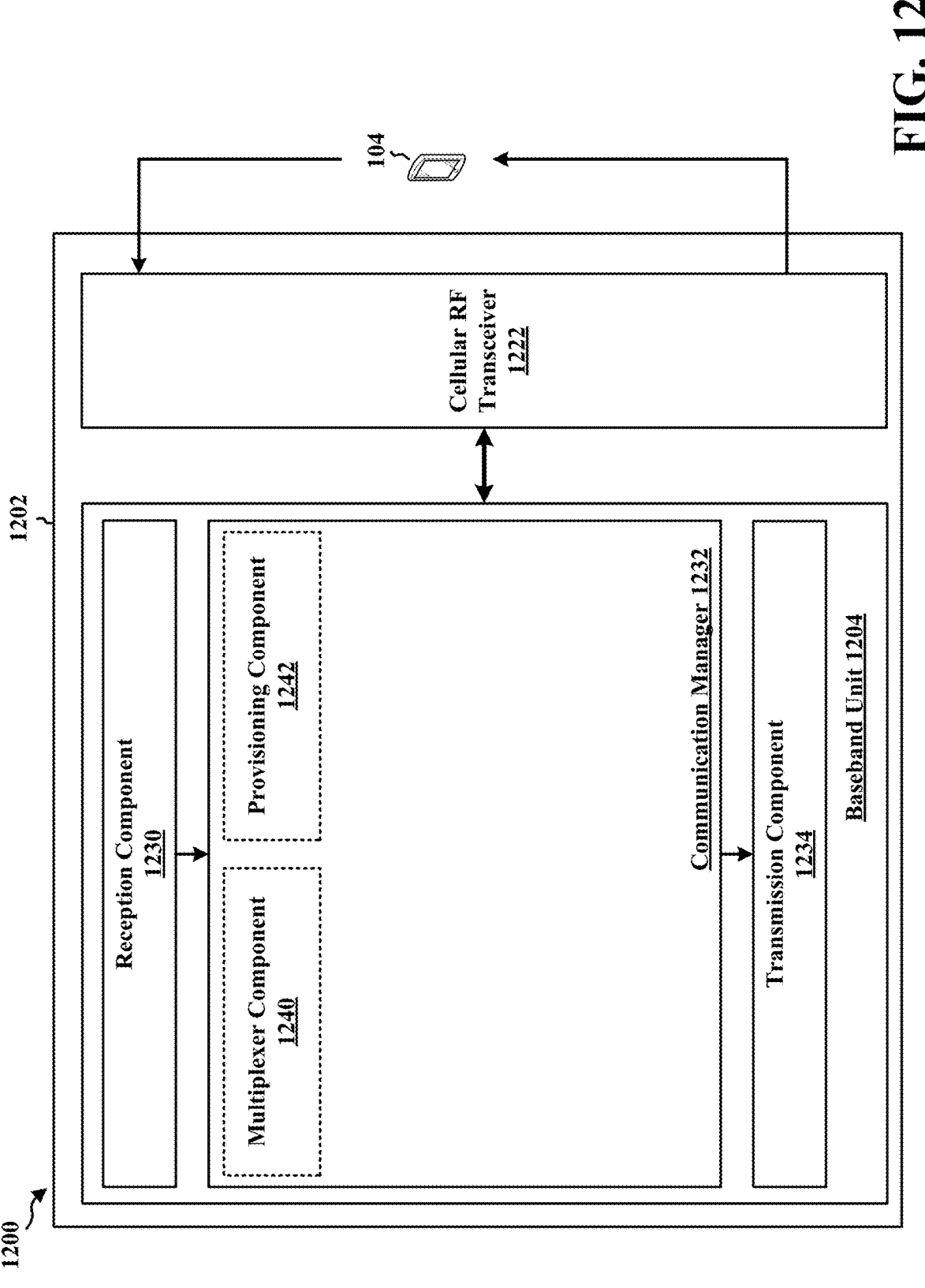
FIG. 12 is a diagram illustrating an example of a hardware implementation for an example apparatus.

FIG. 12 is a diagram 1200 illustrating an example of a hardware implementation for an apparatus 1202. The apparatus 1202 may be a base station, a component of a base station, or may implement base station functionality. In some aspects, the apparatus 1302 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes a multiplexer component 1240 that is configured, e.g., as described in connection with 802, 910, 914, 916, and 918, to transmit, within a symbol, the one or more DMRSs; to TDM multiple DMRSs of different antenna ports with the intra-symbol guard interval provided between the multiple DMRSs; to CDM multiple DMRSs of different antenna ports within the symbol based; and to multiplex the one or more DMRSs with at least one PDSCH— the intra-symbol guard interval is provided between each of the one or more DMRSs and the at least one PDSCH. The communication manager 1232 further includes a provisioning component 1242 that is configured, e.g., as described in connection with 804 and 912, to provide an intra-symbol guard interval prior to each of the one or more DMRSs—the intra-symbol guard interval has a duration that is based on the duration of the CP.

The reception component 1230 is configured, e.g., as described in connection with 904 and 906, to receive channel estimation information from the UE—a duration of at least one of one or more DMRSs is based on the channel estimation information from the UE; and to receive an SRS from a UE—a configuration for the UE is based on the SRS. The transmission component 1234 is configured, e.g., as described in connection with 902 and 908, to transmit a CSI-RS to a UE; and to transmit the configuration to the UE for at least one of a duration of one or more DMRSs, a PDSCH duration, a CP duration, or a number of antenna ports.

The apparatus may include additional components that perform each of the blocks of the algorithm in the flowcharts of FIGS. 8-9. As such, each block in the flowcharts of FIGS. 8-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for transmitting, within a symbol, one or more DMRSs; and means for providing an intra-symbol guard interval prior to each of the one or more DMRSs, the intra-symbol guard interval having a duration that is based on a duration of a CP. The apparatus 1202 further includes means for TDMing multiple DMRSs of different antenna ports with the intra-symbol guard interval provided between the multiple DMRSs. The apparatus 1202 further includes means for CDMing multiple DMRSs of different antenna ports within the symbol. The apparatus 1202 further includes means for multiplexing the one or more DMRSs with at least one PDSCH, where at least one of: the intra-symbol guard interval is positioned between the one or more DMRSs and a first PDSCH of the at least one PDSCH that is prior to the one or more DMRSs, or a second intra-symbol guard interval is positioned between the one or more DMRSs and a second PDSCH of the at least one PDSCH that follows the one or more DMRSs. The apparatus 1202 further includes means for transmitting a CSI-RS to the UE; and means for receiving channel estimation information from the UE, where the duration of at least one of the one or more DMRSs is based on the channel estimation information from the UE. The apparatus 1202 further includes means for transmitting a configuration to a UE for at least one of a duration of the one or more DMRSs, a PDSCH duration, a CP duration, or a number of antenna ports. The apparatus 1202 further includes means for receiving an SRS from the UE, the configuration for the UE based on the SRS.

The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 13:
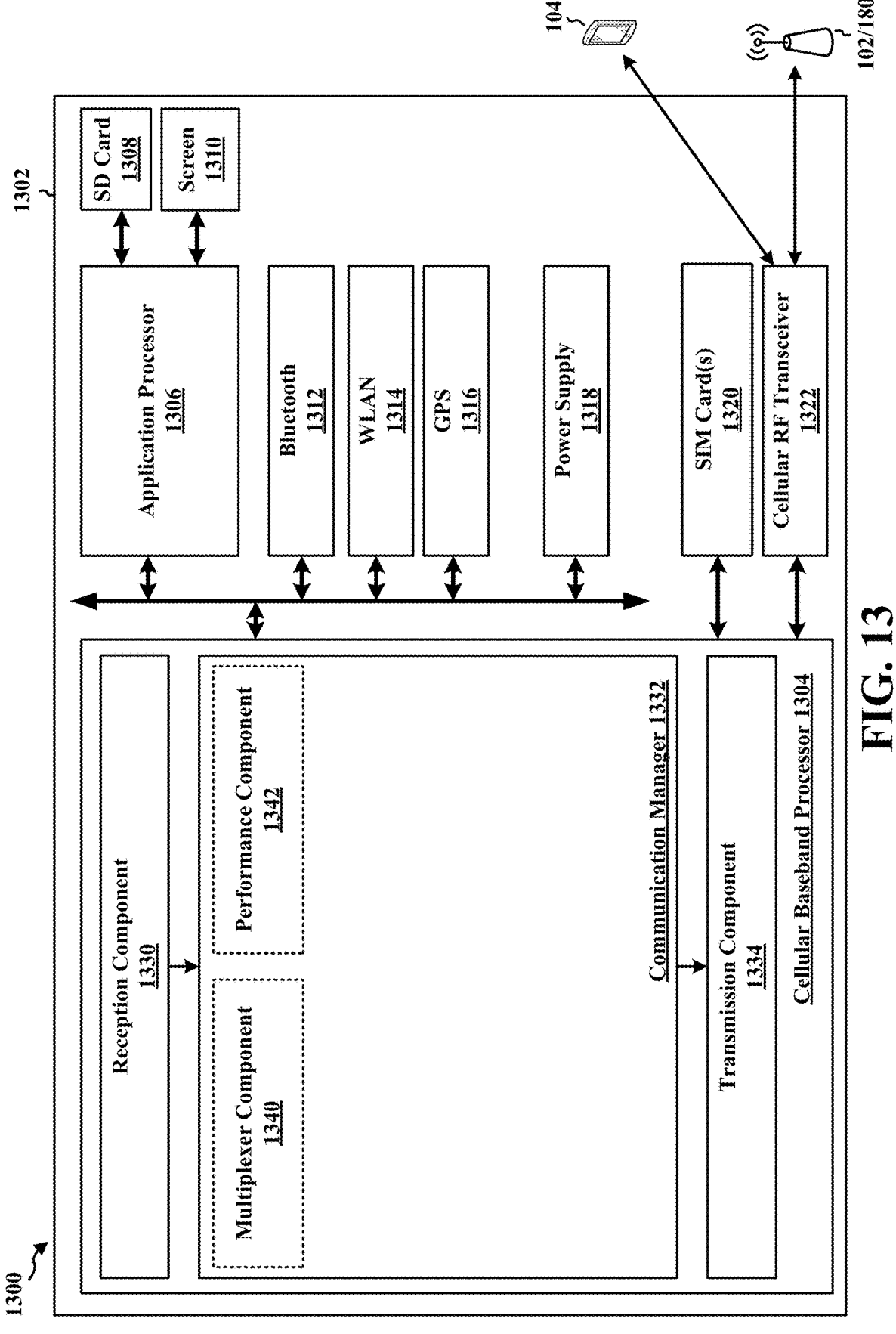
FIG. 13 is a diagram illustrating an example of a hardware implementation for an example apparatus.

FIG. 13 is a diagram 1300 illustrating an example of a hardware implementation for an apparatus 1302. The apparatus 1302 may be a UE, a component of a UE, or may implement UE functionality. In some aspects, the apparatus 1302 may include a cellular baseband processor 1304 (also referred to as a modem) coupled to a cellular RF transceiver 1322. In some aspects, the apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, or a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the additional modules of the apparatus 1302.

The communication manager 1332 includes a multiplexer component 1340 that is configured, e.g., as described in connection with 1002, 1110, 1112, 1114, and 1116, to receive one or more DMRSs within a symbol and having an intra-symbol guard interval prior to each of the one or more DMRSs—the intra-symbol guard interval has a duration that is based on a duration of a CP; to receive DMRSs of different antenna ports that are TDMed with the intra-symbol guard interval provided between the DMRSs of the different antenna ports; to receive multiple DMRSs for at least one of the different antenna ports within the symbol—the multiple DMRSs are CDMed; and to receive the one or more DMRSs multiplexed with at least one PDSCH—the intra-symbol guard interval is provided between each of the one or more DMRSs and the at least one PDSCH. The communication manager 1332 further includes a performance component 1342 that is configured, e.g., as described in connection with 1004 and 1118, to perform a channel estimation based on at least one of the one or more DMRSs.

The reception component 1330 is configured, e.g., as described in connection with 1102 and 1108, to receive a CSI-RS from a base station; and to receive a configuration from the base station for at least one of a duration of one or more DMRSs, a PDSCH duration, a CP duration, or a number of antenna ports. The transmission component 1334 is configured, e.g., as described in connection with 1104 and 1106, to transmit channel estimation information to the base station—a duration of at least one of one or more DMRSs is based on the channel estimation information transmitted to the base station; and to transmit an SRS to the base station—a configuration is received from the base station based on the SRS.

The apparatus may include additional components that perform each of the blocks of the algorithm in the flowcharts of FIGS. 10-11. As such, each block in the flowcharts of FIGS. 10-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the cellular baseband processor 1304, includes means for receiving one or more DMRSs within a symbol and having an intra-symbol guard interval prior to each of the one or more DMRSs, the intra-symbol guard interval having a duration that is based on a duration of a CP; and means for performing a channel estimation based on at least one of the one or more DMRSs. The apparatus 1302 further includes means for receiving DMRSs of different antenna ports included in the one or more DMRSs, the DMRSs of the different antenna ports TDMed with the intra-symbol guard interval provided between the DMRSs of the different antenna ports. The apparatus 1302 further includes means for receiving and means for demultiplexing multiple DMRSs for at least one of the different antenna ports within the symbol, where the multiple DMRSs are CDMed. The apparatus 1302 further includes means for receiving the one or more DMRSs multiplexed with at least one PDSCH, where at least one of:

the intra-symbol guard interval is positioned between the one or more DMRSs and a first PDSCH of the at least one PDSCH that is prior to the one or more DMRSs, or a second intra-symbol guard interval is positioned between the one or more DMRSs and a second PDSCH of the at least one PDSCH that follows the one or more DMRSs. The apparatus 1302 further includes means for receiving a CSI-RS from the base station; and means for transmitting channel estimation information to the base station, where the duration of at least one of the one or more DMRSs is based on the channel estimation information transmitted to the base station. The apparatus 1302 further includes means for receiving a configuration from a base station for at least one of a duration of the one or more DMRSs, a PDSCH duration, a CP duration, or a number of antenna ports. The apparatus 1302 further includes means for transmitting an SRS to the base station, the configuration received from the base station based on the SRS.

The means may be one or more of the components of the apparatus 1302 configured to perform the functions recited by the means. As described supra, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a base station, including: transmitting, within a symbol, one or more DMRSs; and providing an intra-symbol guard interval prior to each of the one or more DMRSs, the intra-symbol guard interval having a duration that is based on a duration of a CP.

Aspect 2 may be combined with aspect 1 and further includes time division multiplexing multiple DMRSs of different antenna ports with the intra-symbol guard interval provided between the multiple DMRSs.

Aspect 3 may be combined with any of aspects 1-2 and further includes code division multiplexing at least two of the multiple DMRSs of different antenna ports within the symbol.

Aspect 4 may be combined with any of aspects 1-3 and further includes multiplexing the one or more DMRSs with at least one PDSCH, where at least one of: the intra-symbol guard interval is positioned between the one or more DMRSs and a first PDSCH of the at least one PDSCH that is prior to the one or more DMRSs, or a second intra-symbol guard interval is positioned between the one or more DMRSs and a second PDSCH of the at least one PDSCH that follows the one or more DMRSs.

Aspect 5 may be combined with any of aspects 1-4 and includes that multiplexing the one or more DMRSs with the at least one PDSCH includes time division multiplexing the one or more DMRSs with the second PDSCH and a third PDSCH of the at least one PDSCH, where the third PDSCH follows the second PDSCH, and where the third intra-symbol guard interval is positioned between the second PDSCH and the third PDSCH.

Aspect 6 may be combined with any of aspects 1-5 and includes that the duration of the intra-symbol guard interval for the symbol is equal to or greater than the duration of the CP for the symbol.

Aspect 7 may be combined with any of aspects 1-6 and includes that the duration of each of the one or more DMRSs is based on a corresponding channel condition for a UE.

Aspect 8 may be combined with any of aspects 1-7 and further includes transmitting a CSI-RS to the UE; and receiving channel estimation information from the UE, where the duration of at least one of the one or more DMRSs is based on the channel estimation information from the UE.

Aspect 9 may be combined with any of aspects 1-6 and further includes transmitting a configuration to a UE for a duration of the one or more DMRSs.

Aspect 10 may be combined with any of aspects 1-6 and 9 and further includes transmitting a configuration to a UE for a PDSCH duration.

Aspect 11 may be combined with any of aspects 1-6 and 9-10 and further includes transmitting a configuration to a UE for a CP duration.

Aspect 12 may be combined with any of aspects 1-6 and 9-11 and further includes transmitting a configuration to a UE for a number of antenna ports.

Aspect 13 may be combined with any of aspects 1-6 and 9-12 and further includes receiving an SRS from the UE, and where the configuration for the UE is based on the SRS.

Aspect 14 may be combined with any of aspects 1-6 and 9-13 and includes that the configuration is dynamic.

Aspect 15 may be combined with any of aspects 1-6 and 9-13 and includes that the configuration is static.

Aspect 16 may be combined with any of aspects 1-6 and 9-13 and includes that the configuration is semi-static.

Aspect 17 may be combined with any of aspects 1-6 and 9-16 and includes that a first duration of a first DMRS in the symbol is configured independently from a second duration of a second DMRS in the symbol, where the first duration of the first DMRS and the second duration of the second DMRS are based on respective channel conditions for each corresponding antenna port.

Aspect 18 is a method of wireless communication at a UE, including: receiving one or more DMRSs within a symbol and having an intra-symbol guard interval prior to each of the one or more DMRSs, the intra-symbol guard interval having a duration that is based on a duration of a CP; and performing a channel estimation based on at least one of the one or more DMRSs.

Aspect 19 may be combined with aspect 18 and further includes receiving DMRSs of different antenna ports included in the one or more DMRSs, the DMRSs of the different antenna ports are time division multiplexed with the intra-symbol guard interval provided between the DMRSs of the different antenna ports.

Aspect 20 may be combined with any of aspects 18-19 and further includes receiving multiple DMRSs for at least one of the different antenna ports within the symbol, where the multiple DMRSs are code division multiplexed.

Aspect 21 may be combined with any of aspects 18-20 and further includes receiving the one or more DMRSs multiplexed with at least one PDSCH, where at least one of: the intra-symbol guard interval is positioned between the one or more DMRSs and a first PDSCH of the at least one PDSCH that is prior to the one or more DMRSs, or a second intra-symbol guard interval is positioned between the one or more DMRSs and a second PDSCH of the at least one PDSCH that follows the one or more DMRSs.

Aspect 22 may be combined with any of aspects 18-21 and includes that the one or more DMRSs are time division multiplexed (TDM) with the second PDSCH and a third PDSCH of the at least one PDSCH, where the third PDSCH follows the second PDSCH, and where a third intra-symbol guard interval is positioned between the second PDSCH and the third PDSCH.

Aspect 23 may be combined with any of aspects 18-22 and includes that the duration of the intra-symbol guard interval for the symbol is equal to or greater than the duration of the CP for the symbol.

Aspect 24 may be combined with any of aspects 18-23 and includes that the duration of each of the one or more DMRSs is based on a corresponding channel condition associated with an antenna port.

Aspect 25 may be combined with any of aspects 18-24 and further includes receiving a CSI-RS from the base station; and transmitting channel estimation information to the base station, where the duration of at least one of the one or more DMRSs is based on the channel estimation information transmitted to the base station.

Aspect 26 may be combined with any of aspects 18-23 and 25 and further includes receiving a configuration from a base station for a duration of the one or more DMRSs.

Aspect 27 may be combined with any of aspects 18-23 and 25-26 and further includes receiving a configuration from a base station for a PDSCH duration.

Aspect 28 may be combined with any of aspects 18-23 and 25-27 and further includes receiving a configuration from a base station for a CP duration.

Aspect 29 may be combined with any of aspects 18-23 and 25-28 and further includes receiving a configuration from a base station for a number of antenna ports.

Aspect 30 may be combined with any of aspects 18-23 and 25-29 and further includes transmitting an SRS to the base station, and where the configuration received from the base station is based on the SRS.

Aspect 31 may be combined with any of aspects 18-23 and 25-30 and includes that the configuration is dynamic.

Aspect 32 may be combined with any of aspects 18-23 and 25-30 and includes that the configuration is static.

Aspect 33 may be combined with any of aspects 18-23 and 25-30 and includes that the configuration is semi-static.

Aspect 34 may be combined with any of aspects 18-23 and 25-33 and includes that a first duration of a first DMRS in the symbol is configured independently from a second duration of a second DMRS in the symbol, where the first duration of the first DMRS and the second duration of the second DMRS are based on respective channel conditions for each corresponding antenna port.

Aspect 35 is an apparatus for wireless communication including a memory and at least one processor coupled to the memory and configured to implement any of aspects 1-34.

Aspect 36 may be combined with aspect 35 and includes that the apparatus comprises a transceiver coupled to the at least one processor.

Aspect 37 is an apparatus for wireless communication including means for implementing any of aspects 1-34.

Aspect 38 is a computer-readable medium storing computer executable code, the code when executed by at least one processor causes the at least one processor to implement any of aspects 1-34.

What is claimed is:

1. An apparatus for wireless communication, comprising:
a memory; and
at least one processor coupled to the memory, wherein the at least one processor is configured to:
transmit, within a symbol, one or more demodulation reference signals (DMRSs); and
provide an intra-symbol guard interval prior to each DMRS of the one or more DMRSs, wherein the intra-symbol guard interval has a duration that is based on a duration of a cyclic prefix (CP), and wherein the intra-symbol guard interval is separate from the CP.

2. The apparatus of claim 1, wherein the at least one processor is configured to: time division multiplex (TDM) multiple DMRSs of different antenna ports with the intra-symbol guard interval between the multiple DMRSs, wherein the one or more DMRSs include the multiple DMRSs.

3. The apparatus of claim 2, wherein the at least one processor is configured to: code division multiplex (CDM) at least two of the multiple DMRSs of the different antenna ports within the symbol.

4. The apparatus of claim 1, wherein the at least one processor is configured to multiplex the one or more DMRSs with at least one physical downlink shared channel (PDSCH), and wherein the intra-symbol guard interval is positioned between the one or more DMRSs and the at least one PDSCH.

5. The apparatus of claim 1, wherein the duration of the intra-symbol guard interval for the symbol is equal to or greater than the duration of the CP for the symbol.

6. The apparatus of claim 1, wherein the duration of each of the one or more DMRSs is based on a corresponding channel condition for a user equipment (UE).

7. The apparatus of claim 6, wherein the at least one processor is configured to:
transmit a channel state information-reference signal (CSI-RS) to the UE; and
receive channel estimation information from the UE, wherein the duration of at least one of the one or more DMRSs is based on the channel estimation information from the UE.

8. The apparatus of claim 1, wherein the at least one processor is configured to transmit a configuration to a user equipment (UE) for at least one of:
a duration of the one or more DMRSs,
a physical downlink shared channel (PDSCH) duration,
the duration of the CP, or
a number of antenna ports.

9. The apparatus of claim 8, wherein the at least one processor is configured to receive a sounding reference signal (SRS) from the UE, and wherein the configuration for the UE is based on the SRS.

10. The apparatus of claim 8, wherein a first duration of a first DMRS in the symbol is configured independently from a second duration of a second DMRS in the symbol.

11. The apparatus of claim 10, wherein the first duration of the first DMRS and the second duration of the second DMRS are based on respective channel conditions for each corresponding antenna port.

12. A user equipment (UE) for wireless communication, comprising:
a memory; and
at least one processor coupled to the memory, wherein the at least one processor is configured to:
receive a symbol, wherein the symbol includes one or more demodulation reference signals (DMRSs) and an intra-symbol guard interval prior to each DMRS of the one or more DMRSs, wherein the intra-symbol guard interval has a duration that is based on a duration of a cyclic prefix (CP), and wherein the intra-symbol guard interval is separate from the CP; and
perform a channel estimation based on at least one of the one or more DMRSs.

13. The UE of claim 12, wherein the one or more DMRSs include a first DMRS and a second DMRS, wherein the first DMRS corresponds to a first antenna port and the second DMRS corresponds to a second antenna port, and wherein the intra-symbol guard interval is between the first DMRS and the second DMRS.

14. The UE of claim 13, wherein the first DMRS and the second DMRS are code division multiplexed (CDM).

15. The UE of claim 12, wherein the symbol includes the one or more DMRSs multiplexed with at least one physical downlink shared channel (PDSCH), and wherein the intra-symbol guard interval is positioned between the one or more DMRSs and the at least one PDSCH.

16. The UE of claim 12, wherein the duration of the intra-symbol guard interval for the symbol is equal to or greater than the duration of the CP for the symbol.

17. The UE of claim 12, wherein the duration of each of the one or more DMRSs is based on a corresponding channel condition associated with an antenna port.

18. The UE of claim 17, wherein the at least one processor is configured to:

receive a channel state information-reference signal (CSI-RS) from a base station; and transmit channel estimation information to the base station, wherein the duration of at least one of the one or more DMRSs is based on the channel estimation information transmitted to the base station.

19. The UE of claim 12, wherein the at least one processor is configured to receive a configuration from a base station for at least one of:

a duration of the one or more DMRSs, a physical downlink shared channel (PDSCH) duration, the duration of the CP, or a number of antenna ports.

20. The UE of claim 19, wherein the at least one processor is configured to transmit a sounding reference signal (SRS) to the base station, and wherein the configuration received from the base station is based on the SRS.

21. The UE of claim 19, wherein a first duration of a first DMRS in the symbol is configured independently from a second duration of a second DMRS in the symbol.

22. The UE of claim 21, wherein the first duration of the first DMRS and the second duration of the second DMRS are based on respective channel conditions for each corresponding antenna port.

23. A method of wireless communication performed by a base station, comprising:

transmitting, within a symbol, one or more demodulation reference signals (DMRSs); and providing an intra-symbol guard interval prior to each DMRS of the one or more DMRSs, wherein the intra-symbol guard interval has a duration that is based on a duration of a cyclic prefix (CP), and wherein the intra-symbol guard interval is separate from the CP.

24. The method of claim 23, further comprising time division multiplexing (TDM) multiple DMRSs of different antenna ports with the intra-symbol guard interval between the multiple DMRSs, wherein the one or more DMRSs include the multiple DMRSs.

25. The method of claim 23, further comprising multiplexing the one or more DMRSs with at least one physical downlink shared channel (PDSCH), wherein the intra-symbol guard interval is positioned between the one or more DMRSs and the at least one PDSCH.

26. A method of wireless communication performed by a user equipment (UE), comprising:

receiving a symbol, wherein the symbol includes one or more demodulation reference signals (DMRSs) and an intra-symbol guard interval prior to each DMRS of the one or more DMRSs, wherein the intra-symbol guard interval has a duration that is based on a duration of a cyclic prefix (CP), and wherein the intra-symbol guard interval is separate from the CP; and performing a channel estimation based on at least one of the one or more DMRSs.

27. The method of claim 26, further comprising receiving the one or more DMRSs within DMRSs of different antenna ports that are time division multiplexed (TDM) with the intra-symbol guard interval between the DMRSs of the different antenna ports.

28. The method of claim 26, wherein the symbol includes the one or more DMRSs multiplexed with at least one physical downlink shared channel (PDSCH), and wherein the intra-symbol guard interval is positioned between the one or more DMRSs and the at least one PDSCH.

* * * * *